United States Patent [19]

Knorr

[11] Patent Number: 4,895,101

[45] Date of Patent: Jan. 23, 1990

[54] DEVICE FOR LOWERING AND LIFTING SUPPORTS HOLDING OBJECTS TO BE COATED WITH CHEMICAL SUBSTANCES IN PLATING BATHS

[75] Inventor: Heinrich Knorr, Feucht, Fed. Rep. of Germany

[73] Assignee: Schering Aktiengesellschaft, Berlin and Berghamen, Fed. Rep. of Germany

[21] Appl. No.: 189,466

[22] Filed: May 2, 1988

[30] Foreign Application Priority Data

May 2, 1987 [DE] Fed. Rep. of Germany ....... 3714728

[51] Int. Cl.⁴ ................................................ B05C 3/00

[52] U.S. Cl. .................................... 118/425; 118/423; 414/749; 414/626; 212/149; 212/213; 212/221

[58] Field of Search ......................... 118/423, 425, 66; 414/626, 749; 212/146, 149, 190, 213, 221

[56] References Cited

U.S. PATENT DOCUMENTS

| | | | |
|---|---|---|---|
| 2,609,954 | 9/1952 | Sutherland et al. | 414/626 |
| 4,262,628 | 4/1981 | Dukes et al. | 118/425 |
| 4,487,741 | 12/1984 | Vuckovich et al. | 212/149 X |
| 4,527,508 | 7/1985 | Juve | 118/425 |

FOREIGN PATENT DOCUMENTS 2639542 7/1986 Fed. Rep. of Germany .

*Primary Examiner*—Shrive Beck
*Assistant Examiner*—Alain Bashore
*Attorney, Agent, or Firm*—Michael J. Striker

[57] ABSTRACT

A device for inserting a support holding an object into and removing said support with the object from a galvanizing bath comprises a transporting carriage and a lifting device for lifting and lowering said support. The support has outwardly extending arms engageable by the lifting elements of the lifting device. Guiding strips are provided for the lateral portions of the support to prevent its tilting during the lowering and lifting movement.

8 Claims, 2 Drawing Sheets

FIG. 2
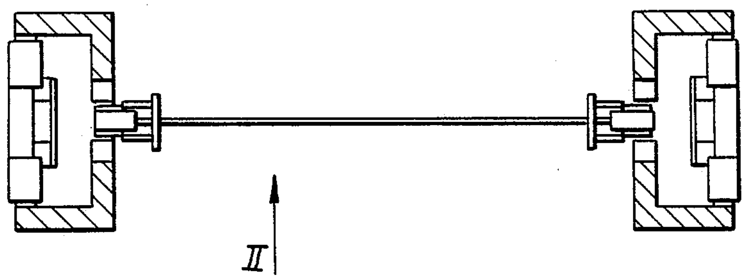
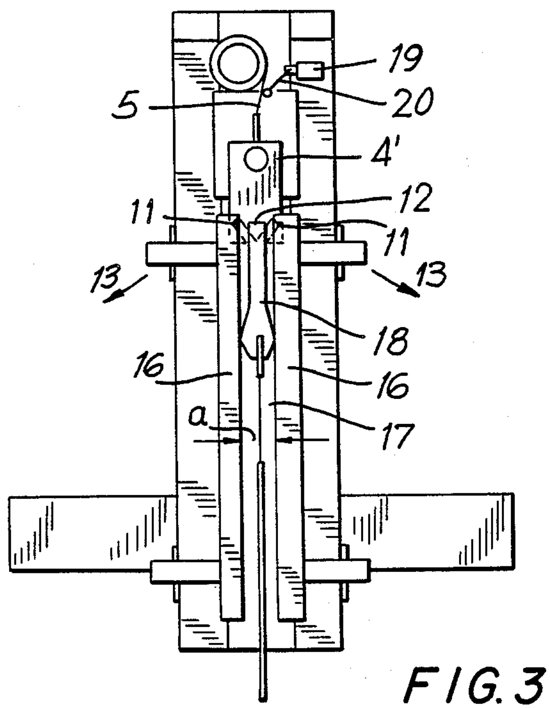
FIG. 3

DEVICE FOR LOWERING AND LIFTING SUPPORTS HOLDING OBJECTS TO BE COATED WITH CHEMICAL SUBSTANCES IN PLATING BATHS

BACKGROUND OF THE INVENTION

The present invention relates to a device which serves to lower a support with an object suspended thereon into a bath filled with a chemical substance and lifting said support from the bath after the coating process.

Devices of the type under discussion are known. One of such devices has been disclosed in German patent document DE-PS 26 39 542. The lifting device movable up and down is disclosed in this German patent. A relatively short guiding rail having a U-shaped cross-section is pivotally connected to the lifting device. The guiding rail forms, with the aid of the coulisse control during the engagement of the lifting parts of the lifting device in the supporting parts of the object support, a guide for these supporting parts. This conventional device, however, has some disadvantages. As mentioned above, the guiding rail is relatively short so that safety against tilting is obtained only over a relatively short part of the entire downward and upward movement of the object support. It is, however possible in practice in some cases, that an undesired lifting of the lifting parts from the supporting parts, also after the lowering of the object support takes place over such a path that the supports ca be positioned outside the short guiding rail. Then, also possible is the tilting of the object support laterally and thus the damage to the object support, the object itself and further structural components of the device. The coulisse control and the pivoting ability of the guiding rail require a number of bearing places. Inasmuch as these bearing places are positioned at a small distance from the bath containing the most agressive chemicals, these bearing places can be quickly contaminated or chemically attacked.

Should the tilting occur the guiding rail must take the entire tilting weight and transmit it through the bearing places to the lifting device and from the latter further to the transporting carriage. The guiding rail and the lifting device are, however, relatively sensitive and not very stable parts so that difficulties occur when the aforementioned tilting weight should be taken up by them. Furthermore, the conventional lifting device with the guiding rail must carry an approximation switch which in case of disturbance of the lowering and lifting parts would issue a respective signal responsive to such disturbance, and a further lowering of the lifting device would be stopped. This approximation switch is positioned above the bath and can be also damaged by an aggressive vapor or disturbed. In such a case an alert signal would not be issued and the motion of the lifting device would not be ceased, and the object support with the object suspended thereon would tilt to the side until its supporting parts are moved from the relatively short guiding region.

A further disadvantage of the above-described conventional device resides in that the lifting device movable up and down must be provided with movable cables or wires for the approximation switch which can be therefore quickly damaged due to continuous movement. The aforementioned known device also presents a danger of buckling of objects during operation.

SUMMARY OF THE INVENTION

It is an object of the present invention to provide an improved device for lowering and lifting a support holding an object into and from a plating bath in which the object is coated.

It is another object of the invention to provide such a guiding for the object support, that would ensure a robust and simple device, and on the other hand, would ensure a reliable functioning of the device in all possible cases of moving the lifting parts from the supporting parts.

These and other objects of the invention are attained by a device for lowering and lifting supports holding objects into and from a bath containing chemical substances, particularly galvanic substances, for coating said objects, the device comprising a transporting carriage movable along the bath; a lifting device movable by said carriage; means to move said lifting device in a vertical direction up and down; each support for holding objects including two supporting arms, said lifting device including lifting means which are brought below said supporting arms upon movement from said transporting carriage; and guiding means for guiding said support in case of lifting off said supporting arms from said lifting means, said guiding means being fixed to said transporting carriage and extending over at least a substantial part of a lifting or lowering path of said lifting device and said support.

The device may include connecting means to fix said guiding means to said transporting carriage, for example to the vertical struts of said carriage.

If at any location the movement of the object on the support is blocked either due to the protruding part preventing an unobstructed motion of the object support or due to an irregular lowering, the lifting device is further lowered. In each of these cases, the extension of the guiding part over at least a substantial length of the lifting and lowering path is provided so that the tilting of the support holding an object, which tilting can damage the device, would not occur. Since the guiding part is rigidly secured to the transporting carriage the weight of the support as well as the weight of the object being coated, in case of the tilting of the support to the side, would be taken up by a very robust structural component, namely the transporting carriage or by its bars or rods. Therefore, the substantially lighter and more sensitive lifting device would not be loaded with an additional weight due to the above described tilting. Mechanical parts subject to attacks by vapors of the bath liquid, various hinge connections or the like, as well as electric wires or switches are not provided in the region near the bath.

The supporting arms may be each positioned at each side of said support, respectively; said support further including two guiding portions; and guiding means including guiding strips fixed to said transporting carriage and arranged in pairs at each side of said support, the guiding strips of each pair being spaced from each other by a distance equal to a thickness of said guiding portion and each supporting arm so that said supporting arm with said guiding portion thereof is guided between two guiding strips of each pair.

The guiding means is simple in structure and reliable in operation.

The guiding strips may be made of a plastic resistant to chemically aggressive material vapors.

Also, these strips can be metallic.

The lifting device may include a traverse which supports said lifting means, said traverse being positioned to move from outside through a space between said guiding strips of each pair, said lifting means being lifting elements directed outwardly from an object held by said support and engage said supporting arms after said lifting elements have been brought below said supporting arms.

In contrast to the device disclosed in the aforementioned disclosure DE-PS 2,639,542, the structural components of the transporting carriage, which can be contaminated with the bath liquid during the movement of the transporting carriage along the bath, are positioned outside the guiding strips and the object support. Thus offers a possibility of constructing a wide and stable transporting carriage which can be supported during its movement on rails laterally of the bath.

Also, in contrast to the device of the German document DE-PS 2,639,542, the frame carrying the lifting device and displaceable within the device is positioned above the bath.

A further advantage of the device resides in that the guiding strips serve, at the same time, for a lateral guidance of the holding arms of the lifting device.

The guiding strips are of such a length that in a lowermost position of said support said guiding strips terminate slightly above the respective guiding portion and the respective supporting arm of the support. Thereby the object support in the lowermost position thereof is never in the way of the transporting carriage with the lifting device when they are moved to other locations at the bath.

The means to move the lifting device in a vertical direction may include cables or belts, at least one of said belts being in cooperation with a belt tension monitoring switch which after relaxing or ceasing a tension of said belt, causes a lowering movement of said lifting device.

An approximation switch and connected therewith expensive movable electric cables of conventional devices can be omitted. Only one switch can be used, which can switch off the transporting means in case of lifting off the lifting device from the object support and which can be fixed on the transporting carriage substantially outside the area affected by vapors of the liquid contained in the bath.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a sectional view taken along line II—II of FIG. 1; and

FIG. 3 is a sectional view taken along line III—III of FIG. 1, on a reduced scale.

DETAIlED DESCRIPTION OF THE PREFERRED EMBODIMENTS

Figure 1:
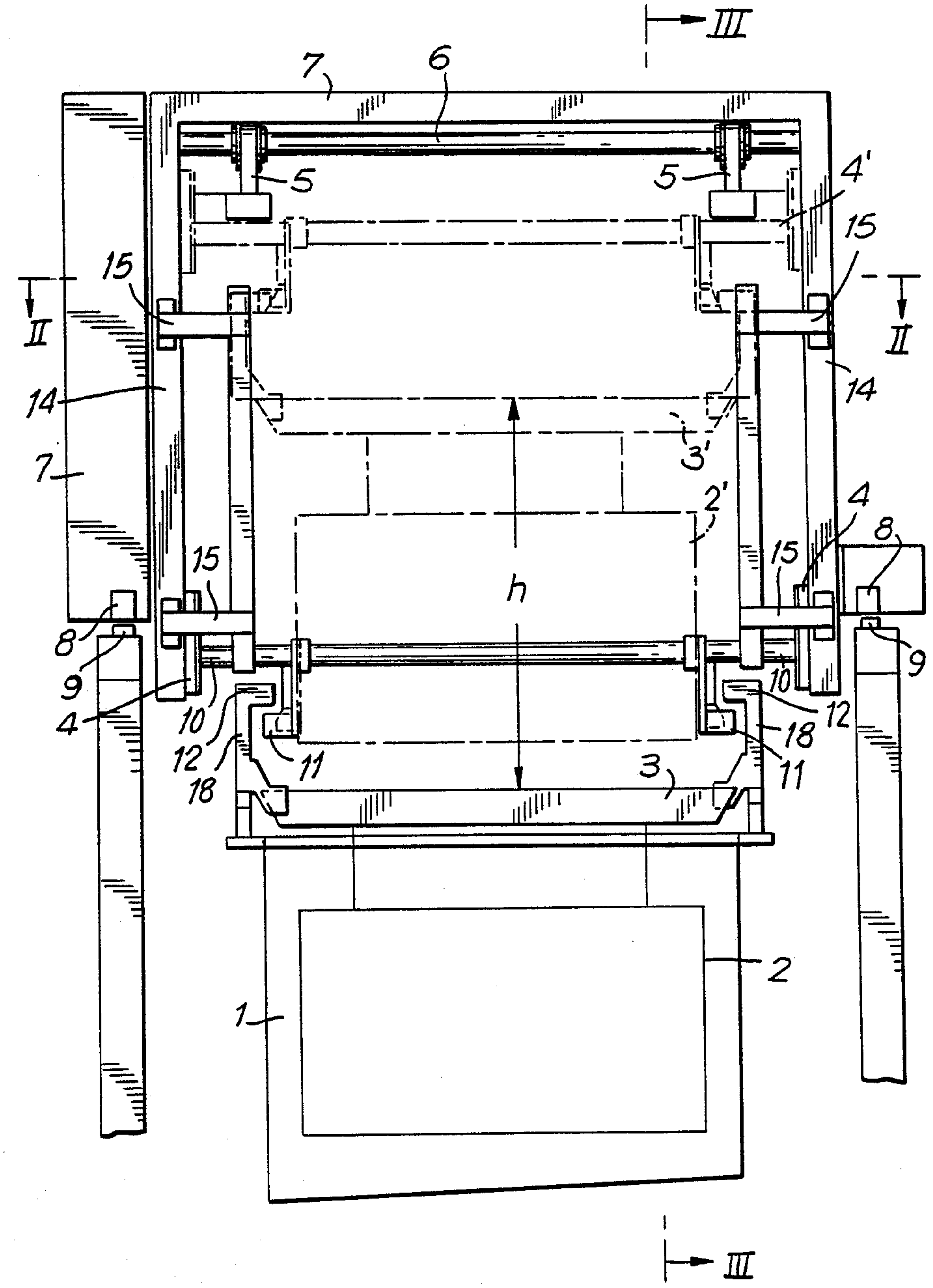
FIG. 1 is a schematic front view of the device for lowering and lifting article supports according to the invention viewed from arrow I of FIG. 2.

Referring to the drawings in detail it will be seen that the device for lowering and raising supports holding objects or articles to be treated in a bath is shown in FIG. 1 schematically. The bath containing a chemical solution particularly a galvanizing solution is designated at 1. Objects 2, for example electric circuit boards to be galvanized in bath 1, are inserted into and removed from the bath by means of a support or carrier 3. The objects 2 are suspended for this purpose on the support 3 which is movable up and down in the vertical direction as shown in FIG. 1. Thereby, objects or boards 2 and the support 3 is shown by the solid line in the fully lowered position and, by the dash-dotted line, in the uppermost position. The maximal path of movement is indicated "h".

The up-and-down movement of the support 3 is executed by means of a lifting device 4 the uppermost position of which is indicated in FIG. 1 by reference numeral 4'. Supporting belts 5 are provided in the device, which are movable together with the lifting device 4 and support 3 suspended thereon by means of a driving shaft 6 of a transporting carriage 7. For the sake of clarity supporting belts 5 are shown in FIG. 1 only in the upper position in which they hold the lifting device 4' and the article support 3 in the upper position 3' shown by the dash-dotted line. The transporting carriage 7 is movable by means of guide rollers 8 on guide rails 9 of the device in the direction which is perpendicular to the plane of the drawing. The object supports 3 can be brought to respective bath-containing containers or loading or unloading stations (not shown).

In order to lift objects held on the support 3 from the bath 1, the transporting carriage 7 is moved along the bath until lifting elements 11 provided on a bar or transverse 10 of the lifting device 4 and extended outwardly from a central axis of the lifting device are positioned below supporting arms 12 provided at two sides of the support 3. If the lifting device 4 is now raised by means of two belts 5 at two sides the lifting elements 11 engage with supporting arms 12, as shown in FIG. 3, and lift the support 3 to its uppermost position 3'. The lifting elements 11, as shown in FIG. 3, can be each comprised of two rail-type pieces which include with each other an acute angle and are adjusted in shape to the swinging arm 12 which is triangular in cross-section which has a downwardly directed acute angle.

Should the lifting device 4 with the support 3 now be lowered from the uppermost position shown by the dash-dotted line and if, during this lowering, the process is blocked due to the tilting of a protruding part of the suspended object or due to any error, the support 3 with its supporting arms 12 will remain in a blocked position whereas the lifting device 4 with its lifting elements 11 will lower further. Thereby it is ensured by the lifting device that support 3 would not tilt in the directions of arrows 13 as shown in FIG. 3. The tilting motion of the support with the object suspended thereon, if not prevented, can lead to substantial damage to the object and also to the bath. In order to prevent such tilting two guiding strips 16 are provided at each side of the transporting carriage 7. The guiding strips 16 form a vertical guiding play or space 17 which has the width "a" for a guiding portion 18 of the supporting arm 12. The width of guiding portion 18 corresponds to that of play "a" which receives and guides the guiding portion 18. Guiding strips 16 are made of plastic which is resistant to chemical aggression and are fixed to carriage 7. In the illustrated embodiment, strips 16 are rigidly secured by the connection bars 15 to vertical bars or rods 14 of the transporting carriage 7. The length of the guiding strips 16 is selected so that they extend at least over the substantial part of the lifting path "h" so that the object support 3 in all the positions in which its tilting can cause damage to the device itself or bath or objects suspended thereon, is secured against such tilting by the pairs of the guiding strips 16. These guiding strips 16 must terminate above the support 3 in its lowermost position so that the transporting carriage 7 with the respectively lowered lifting device 4, as shown by solid lines in FIG. 1, can be moved to the other place of the bath.

Supporting belts 5 (or cables, chains, or the like) are formed of plastics and cooperate with a belt tension switch 19 which has a sensing arm 20 applied to the belt 5. As soon as an error leading to the blocking of the lowering motion of the object support is determined and the lifting device in the process of the further lowering to the support will come to stop the tension of one or both belts 5 will increase, and the further lowering motion of belts 5 will be stopped by switch 19, 20.

It will be understood that each of the elements described above, or two or more together, may also find a useful application in other types of devices for moving supports with objects suspended thereon in a vertical direction to and from a galvanizing bath differing from the types described above.

While the invention has been illustrated and described as embodied in a lifting device for objects to be galvanized, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A device for lowering and lifting object holding supports having supporting arms into and from a bath containing chemical substances for coating the objects, said device comprising:

a carriage for transporting the object holding supports along the bath;

lifting means movable with said transporting carriage for vertically moving the object holding supports into and from the bath, said vertically moving means having means for engaging the supporting arms of the object holding supports; and guiding means fixed to said transporting carriage and extending at least over a substantial part of a vertical movement path of the object holding supports for engaging the supporting arms of the object holding supports to guide the object holding supports in their movement along the vertical movement path, the supporting arms being each positioned at a respective side of an object holding support and including a guiding portion having a predetermined thickness, said guiding means including guiding strips fixed to said transporting carriage and arranged in pairs at each side of the object holding support, the guiding strips of each part being spaced from each other by a distance equal to the predetermined thickness of the guiding portion of each supporting arm so that each supporting arm with the guiding portion thereof is guided between two guiding strips of each pair.

2. The device as defined in claim 1, comprising connecting means to fix said guiding means to said transporting carriage.

3. The device as defined in claim 2, wherein said connecting means connect said guide means to vertically extending struts of said transporting carriage.

4. The device as defined in claim 1, wherein said guiding strips are made of a plastic resistant to chemically aggressive material vapors.

5. The device as defined in claim 1, said lifting means including a traverse which supports said engaging means, traverse being positioned to move from outside through a space between said guiding strips of each pair, said engaging means being engaging elements directed outwardly from an object held by said support and engage said supporting arms after said lifting elements have been brought below said supporting arms.

6. The device as defined in claim 5, wherein in a lowermost position of said support said guiding strips terminate slightly above the respective guiding portion and the respective supporting arm of the support.

7. The device as defined in claim 1, wherein said lifting means includes belts for moving said lifting means in a vertical direction, at least one of said belts being in cooperation with a belt tension monitoring switch which after relaxing or ceasing a tension of said belt, causes a lowering movement of said lifting device.

8. The device as defined in claim 1, wherein said lifting means includes cables for moving said lifting means in a vertical direction.

* * * * *